INVENTOR.
WILLIAM I. Mc. LAUGHLIN
BY PENDLETON, NEUMAN
SEIBOLD & WILLIAMS
ATTORNEYS

Nov. 18, 1969   W. I. McLAUGHLIN   3,478,781
SLIDING BLOCK VALVE AND ACTUATING MECHANISM THEREFOR
Filed Nov. 16, 1967   2 Sheets-Sheet 2

INVENTOR.
WILLIAM I. McLAUGHLIN
BY PENDLETON, NEUMAN
SEIBOLD & WILLIAMS
ATTORNEYS

United States Patent Office 3,478,781
Patented Nov. 18, 1969

3,478,781
SLIDING BLOCK VALVE AND ACTUATING MECHANISM THEREFOR
William I. McLaughlin, Crystal Lake, Ill., assignor to Colorado Manufacturing Corporation, Colorado Springs, Colo.
Filed Nov. 16, 1967, Ser. No. 683,653
Int. Cl. F16k *11/06;* H01j *1/62*
U.S. Cl. 137—625.63                                         8 Claims

ABSTRACT OF THE DISCLOSURE

A sliding block valve is provided with actuating mechanism for moving the sliding block or shuttle back and forth in the chamber in which it is positioned to control the supply of fluid under pressure to, and the exhaust of fluid from, another device, such as a double acting piston. The actuating mechanism comprises a pair of differential cylinders mounted on opposite sides of the valve body with pistons therein connected by a piston rod extending longitudinally through, and being operatively connected to, the shuttle. The inner end of each cylinder is in communication with the shuttle chamber. Fluid under pressure is supplied to the shuttle chamber, and means are provided to equalize the pressure in the chamber at opposite ends of the shuttle. The outer end of the smaller cylinder is continuously vented to the atmosphere. The outer end of the larger cylinder is closed by a pilot valve such as a solenoid valve. The pilot valve is connected to a source of fluid under pressure and may be actuated to connect the outer end of the larger cylinder either to the fluid under pressure or vent it to the atmosphere thereby causing such shuttle to be moved back and forth.

Background of the invention

The present invention is directed to a sliding block valve of the general type disclosed in my prior Patent No. 3,020,927 modified and combined with fluid operated actuating mechanism for moving the valve shuttle back and forth.

A sliding block valve of this type may be used for controlling the alternate supply of fluid under pressure to a motor or mechanism and the exhaust of fluid therefrom.

Summary of the invention

The actuating mechanism is of the differential piston type including a pair of pistons of different effective areas mounted in cylinders secured to the valve body adjacent opposite ends of the shuttle chamber, and a piston rod between the pistons operatively connected to the shuttle. A pilot valve such as a three-way solenoid valve is located at the outer end of the larger cylinder and controls the pressure exerted against the outer or blind side of the larger piston thereby effecting movement of the piston rod and the shuttle.

Although other suitable fluids under pressure may be used for operating the present apparatus, compressed air is preferably employed, and the present invention will be described as being pneumatically operated. With the present construction, the entire apparatus may be readily assembled and disassembled, and all wearing parts such as the pistons, cylinders, shuttle, etc., may be easily and quickly replaced. Moreover, the application of force on the shuttle by the piston rod is all in-line force. There is no tendency for the shuttle to twist or move other than in a straight line, and there is no tendency to bind at the top or bottom or at either side.

As the limit of movement of the shuttle is preferably controlled by contact of the shuttle with the ends of the chamber, there is no metal-to-metal contact between the pistons and the cylinder ends. There is preferably a lost-motion connection between the piston rod and the shuttle, permitting initial movement of the piston rod in either direction before there is movement of the shuttle. Accordingly, even with the shuttle having a tight fit with the chamber walls so as to prevent any leakage, the shuttle may be quickly and readily moved between its positions, permitting positive, relatively high-speed operation.

Brief description of the drawings

A more detailed description of the present invention will be given with respect to the accompanying drawings, in which.

Description of the preferred embodiment

Figure 1:
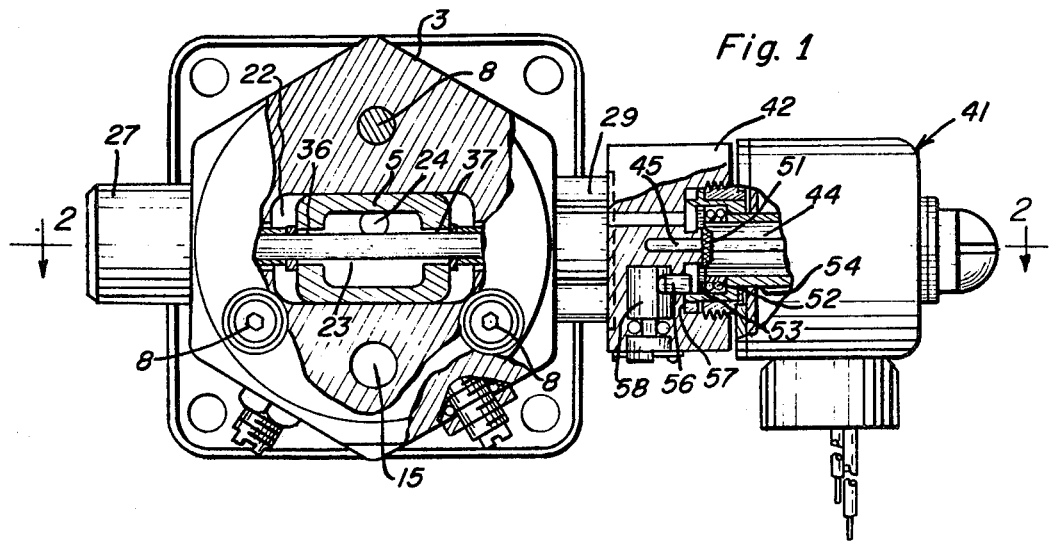
FIGURE 1 is a top plan view of a sliding block valve and actuator of the present invention with parts broken away.

A preferred form of the sliding block valve forming part of the present combination is shown particularly in FIGS. 3–7. The valve proper is preferably formed from a number of separate parts, these being a base 1, a distributor section 2, a main body section 3, a Teflon pressure plate 4 for being received in a depression in the upper face of the distributor section 2, a shuttle 5, a cap 6, and a second Teflon pressure plate 7 positioned in a recess in the lower face of the cap 6. These elements are held in assembled position by bolts 8 which extend from the top of the cap down through the various parts and thread into the base 1.

The base 1 is provided with an inlet port 9 and a common exhaust port 10. The inlet port is connected to a source of fluid under pressure, preferably compressed air. The opposite side of the base has ports A and B (not shown) for connection to an instrument to be operated by the compressed air, such as the opposite ends of a double-acting piston. Each of the ports in the base communicates with a groove in the upper face of the base 1. The inlet port 9 communicates with the groove 11. The exhaust port 10 communicates with the angled groove 12. Port A (not shown), connected to the instrument to be operated, communicates with the groove 13; and port B (not shown), also connected to the instrument to be operated, communicates with groove 14. Each of these grooves connects with one or more vertical passageways extending upwardly from the base. Inlet port 9 and groove 11 connect with a vertical passage 15 which extends up through the valve to a transverse passage in the cap portion 6 that terminates in an opening or recess 16 directly above the shuttle 5.

The distributor section 2 and pressure plate 4 have four centrally located holes 17, 18, 19 and 20. Holes 17 and 18 index with the central portion of the angular groove 12. The hole 19 indexes with groove 13 and the hole 20 indexes with groove 14.

The main body section 3 has a central opening 22 extending vertically therethrough. This opening is rectangular in cross section with rounded corners. The shuttle 5 is positioned in the opening 22, being of a width to slidably engage the side walls of the opening but being shorter than the longitudinal extent of the opening so that it may move back and forth therein from one end to the other. The top and bottom shuttle surfaces closely engage the upper and lower Teflon pressure plates 7 and 4, respectively. These plates form the top and bottom of the shuttle chamber. Instead of Teflon, the pressure plates may be made of other suitable material having equivalent antifriction surface characteristics. The shuttle itself is desirably formed of some lightweight material such as Type BC 11 Nylon having high resistance to abrasion and to hydrocarbons. Such material is somewhat deformable so that the shuttle may fit tightly against the pressure plates above and below it while still being freely slidably longitudinally.

Figure 7:
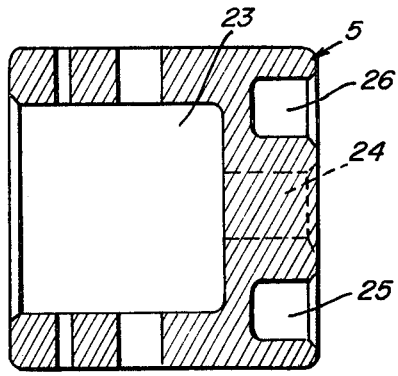
FIG. 7 is a cross-sectional view of the shuttle taken on the line 7—7 of FIG. 5.
Figure 3:
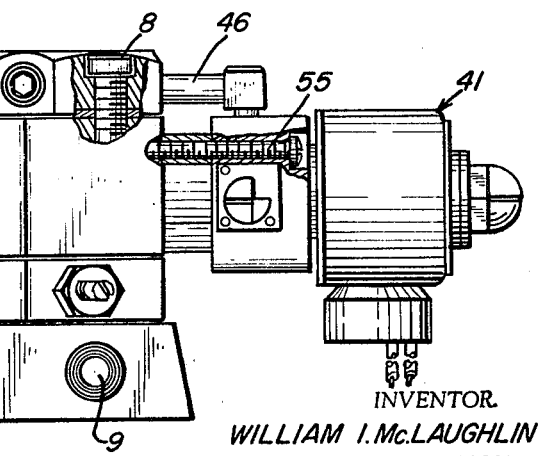
FIG. 3 is a side elevational view of the apparatus shown in FIG. 2 with portions broken away.

The shuttle, as shown particularly in FIG. 7, is dished, preferably having a large central cavity 23. An opening 24 is provided in the bottom of the shuttle 5 and extends from the bottom of the cavity 23 to the lower side of the shuttle. This hole may be located on the transverse center line of the shuttle but is offset from the longitudinal center line. It is so positioned that, with the shuttle in the right-hand position as viewed in FIG. 4, the hole 24 will communicate with the opening 20 in the pressure plate and distributor plate therebelow. When the shuttle is moved to its left-hand position as viewed in FIG. 4, the hole 24 will be aligned with the opening 19 in the pressure plate and distributor portion.

Two transverse grooves 25 and 26 are provided in the bottom of the shuttle adjacent the ends thereof. When the shuttle is in the right-hand position as viewed in FIG. 4, the groove 25 overlies the openings 17 and 19 in the lower pressure plate 4; and when the shuttle is in the other or left-hand position, the groove 26 will overlie the openings 20 and 18 in the lower pressure plate 4.

Figure 4:
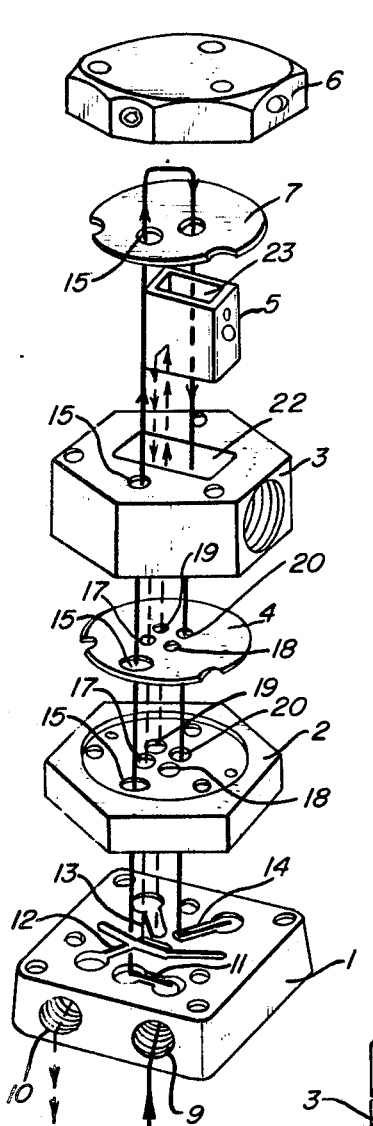
FIG. 4 is an exploded view of the basic sliding block valve.
Figure 5:
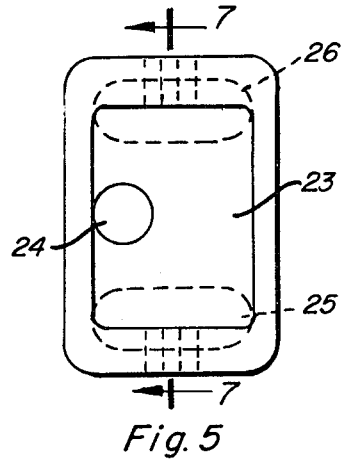
FIG. 5 is a top plan view of a preferred form of shuttle.
Figure 6:
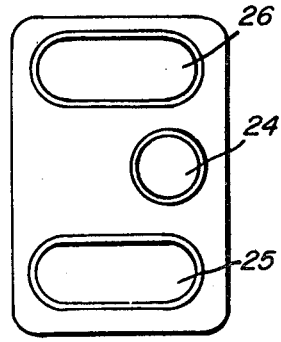
FIG. 6 is a bottom plan view of the shuttle shown in FIG. 5.

Compressed air is constantly supplied to the shuttle cavity 23 irrespective of the position of the shuttle. The compressed air enters the inlet port 9 and flows through the groove 11, the passage formed by the openings 15 in the distributor portion, the two pressure plates, and the main body section, and then into the dome opening 16 in the lower side of the cap 6. With the shuttle moved to the right as illustrated in FIG. 4, the compressed air then enters the cavity in the shuttle 5 and passes downwardly through the opening 24 and the openings 20 in the lower pressure plate and distributor section to the groove 14, and from there out through port B to the piston or other instrument. The exhaust from the other end of the piston enters the base through port A and the groove 13, and passes upwardly through the openings 19 in the distributor section and lower plate to groove 25 in the bottom of the shuttle. This reverses the direction of the exhaust air which then is directed downwardly through the opening 17 in the lower pressure plate and distributor section to the groove 12. From there it flows out through the exhaust port 10.

When the shuttle is moved to its left-hand position as viewed in FIG. 4, the compressed air passes downwardly through the opening 24 in the bottom of the shuttle, the openings 19 in the lower pressure plate and distributor section to the groove 13, and out through the port A. The exhaust from the piston or other mechanism enters port B, passes through the groove 14 and is then directed upwardly through the openings 20 to groove 26 in the bottom of the shuttle. From there it is directed downwardly through the holes 18 in the lower pressure plate and distributor section into the right-hand end of the angular groove 12, and from there out through the exhaust port 10.

Figure 2:
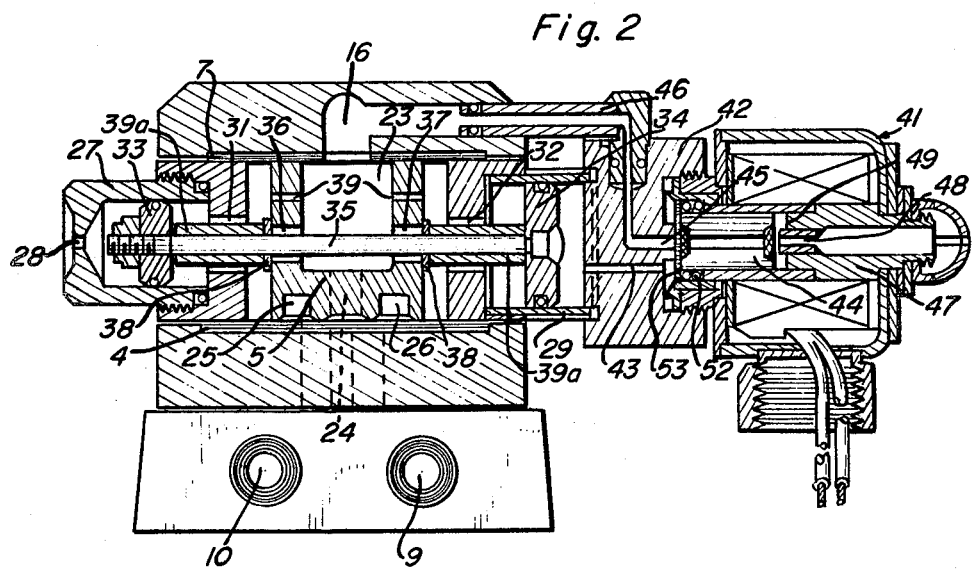
FIG. 2 is a cross-sectional view partially in elevation of the apparatus shown in FIG. 1 taken along line 2—2 of FIG. 1 with the solenoid pilot valve rotated 90°.

The actuating mechanism for moving the shuttle 5 longitudinally in the slot 22 is shown particularly in FIGS. 1 and 2. Certain modifications in the basic valve itself are required to provide the necessary cooperation between the actuating mechanism and the valve. A differential cylinder and piston construction effects movement of the shuttle in either direction by altering the external pressure on the larger piston. This is preferably by means of a secondary three-way electromechanical pilot valve. Effective differential piston areas eliminate the need for springs or other biasing means in the basic valve.

A small cylinder and piston are secured at one side of the main body portion 3 adjacent one end of the chamber 22, and a larger cylinder and piston are secured at the opposite side. Referring particularly to FIGS. 1 and 2, the main body portion is provided with a tapped bore at one side adjacent an end of the chamber 22 for threadedly receiving the smaller cylinder 27 therein. Suitable sealing means are provided at the inner end of the cylinder. The outer end of the cylinder is closed and has an open vent 28 to atmosphere. A relatively large cylinder tube 29 is positioned in a bore at the opposite side of the main body portion.

Each cylinder communicates with the adjacent end of the chamber 22. An opening 31 connects the inner end of the smaller cylinder 27 with the chamber 22, and a second opening 32 connects the inner end of the larger cylinder with the chamber 22. A piston 33 is mounted in the smaller cylinder 27, and a larger piston 34 is in the larger cylinder 29. A piston rod 35 connects the two pistons and extends through openings 36 and 37 in opposite ends of the shuttle 5. The openings 31, 32, 36 and 37 are preferably axially aligned with the cylinders 27 and 29. Moreover, the piston rod passes through substantially the longitudinal axis of the shuttle 5.

The piston rod 35 is operatively connected to the shuttle 5, preferably by a lost-motion connection permitting a slight initial movement of the piston rod in either direction before it picks up the shuttle and moves the latter. Thrust washers 38 are loosely mounted about the piston rod adjacent opposite ends of the shuttle 5. Spacers or collars 39a are loosely mounted on the piston rod 35 between the inner faces of the two pistons and the thrust washers 38. The length of the spacers are such that there is a small cumulative clearance such, for example, as about 1/16" from piston to piston.

The openings 31 and 32 in the ends of the main body section 3 are preferably substantially larger than the outer diameters of the spacers. Also, the openings 36 and 37 in the ends of the shuttle are preferably substantially greater than the diameter of the piston rod 35. Because of this, the pressure in the cavity 23 of the shuttle, at the ends of the chamber 22 and at the inner ends of the pistons 33 and 34, is equalized. It may also be desirable to provide additional passages 39 in the opposite ends of the shuttle for the passage of air, as the washers 38 may tend to retard the passage of air through the openings 36 and 37.

Due to the different effective areas of the two pistons, the compressed air in the valve exerts a substantially greater force on the larger piston thereby tending to move the piston rod and shuttle to the right, as viewed in FIG. 2.

A three-way solenoid pilot valve 41 may be employed to effect movement of the pistons and shuttle between the operative positions of the shuttle. The pilot valve has a valve body 42 bored at one side to fit over and tightly close the outer end of the larger cylinder 29. The pilot valve body 42 is provided with a passageway 43 extending from the outer end of the larger cylinder 29 to adjacent the inner end of the solenoid core 44 which serves as the movable valve member of the solenoid valve. A second passageway 45 extends from adjacent the inner end of the valve member 44 to a transfer tube 46 in communication with the pressure passageway and recess 16 in the cap 6.

The passageway 45 may be connected to any other suitable source of pressure air. Moreover, pressure air to the sliding block valve may be supplied directly to the cap 6 and the recess 16 therein instead of entering the port 9 and passing upwardly through the passage 15.

A core tube assembly 47 has an orifice 48 vented to atmosphere with a raised seat 49 at its inner end. The valve member or solenoid core 44 has a seat 51 at each end formed of some suitable material that will close either the adjacent passage 45 or orifice 48 when in contact therewith. A compression spring 52 installed between a flange 53 on the core and a sleeve 54 projecting from the tube assembly 47 biases the valve member 44 to close the passageway 45 and open the orifice 48. This permits the outer end of the larger cylinder 29 to vent to atmosphere through passageway 43, through longitudinal grooves or open spaces in the periphery of the core 44 through which air may pass and through the orifice 48. This is the unenergized or normal position of the pilot valve.

With the pilot valve in its normal or unenergized position, the outer ends of both cylinders are vented to atmosphere. Therefore, as the force exerted against the inner face of the larger piston is greater than that against the inner face of the smaller piston, the pistons, piston rod and shuttle move, or are urged toward the right, as viewed in FIG. 2, with the larger piston in its outer position and the smaller piston in its inner position.

Actuation of the solenoid valve 41 moves the core tube assembly 44 against the action of the spring 52 to close the orifice 48 and open the passageway 45. When this occurs, passageway 45 communicates with passageway 43, and compressed air is supplied to the outer end of the larger cylinder thereby permitting the pistons, piston rod and the shuttle to be moved to the left, as viewed in FIG. 2. Upon de-energization of the solenoid coil, the valve member 44 is returned to its normal position, closing the pressure passageway 45 and venting the passageway 43 to atmosphere.

A manual override is provided for shifting the pilot valve member 44 to either position when no electrical energy is supplied to the solenoid, or to lock the valve member in energized position irrespective of whether or not the solenoid is connected to a source of electrical energy. The override includes a pin 56 positioned in a hole 57 located in the solenoid body 42 adjacent the inner end of the solenoid core 44. The hole 57 extends parallel to the axis of the core 44 and is so located that the outer end of the pin is in line with the core flange 53. The inner end of the pin 56 is rounded as shown particularly in FIG. 1. A cam 58 positioned in a bore perpendicular to the pin may be made from a round bar milled flat on one side. The size of the cam 58 and the length of the pin 56 are such that, when the rounded portion of the cam abuts the adjacent end of the pin, the pin contacts the flange 53 of the core and the core is maintained in its energized position, closing the orifice 48 and opening the inner end of the passageway 45. When the cam is rotated to bring the milled surface against the end of the pin, the pin may be moved by the flange 53 a sufficient distance to permit the core 44 to close the end of the passageway 45 and open the orifice 48. Any suitable means may be provided for rotating the cam 58.

With the foregoing construction, the shuttle 5 may be very rapidly moved back and forth by an in-line application of force. The combination is extremely trouble-free, and what little wear there is on the wearing parts will be uniform. For example, the wear at the top and bottom of the shuttle is substantially the same. Moreover, the wear between the pistons and their respective cylinders will be substantially uniform throughout their area of contact because there is no force tending to urge the pistons, piston rod or shuttle transversely.

Should it be desired to replace any of the parts, this may be readily accomplished. The bolts 55 securing the pilot valve to the basic shuttle valve may be removed thereby permitting removal of the larger cylinder 29. The smaller cylinder 27 may be removed by unthreading it from the valve body. The pistons and piston rod may then be removed and replaced. To separate the various portions of the shuttle valve, it is only necessary to remove the three securing bolts 8. The various parts of the pilot valve may also be replaced readily.

I claim:
1. The combination with a sliding block valve for being connected to a source of fluid under pressure and having a body portion with a centrally positioned elongated enclosed chamber therein, said body having a passageway for supplying fluid under pressure from said source to a port in one side of said chamber and a plurality of conduits for connection to another instrument leading from another side of said chamber, and a shuttle of less length but substantially the same height and width as said chamber positioned in said chamber for reciprocal movement lengthwise therein, said shuttle having an elongated depression in the side thereof adjacent said pressure supply port for continuous communication with said port, and an opening extending from said depression to said other side for alternately registering with said conduits whereby to control the supply of fluid under pressure to said other instrument and the exhaust of fluid therefrom; of actuating mechanism for reciprocating said shuttle in said chamber comprising a pair of oppositely disposed cylinders of unequal cross-sectional areas secured to opposite sides of said body outwardly of the ends of said chamber, the inner ends of said cylinders being in communication with said chamber, said shuttle having openings extending from said depression through the opposite ends of the shuttle to maintain equalized pressure at opposite ends of said chamber, a piston mounted in each of said cylinders for reciprocation therein, piston rod means having a substantially smaller cross-sectional area than that of said smaller piston operatively connecting each of said pistons to the adjacent end of said shuttle, the outer end of said smaller cylinder being continuously vented to the atmosphere whereby the pressure in said chamber continuously urges said smaller piston outwardly, and a pilot valve adjacent the outer end of said larger cylinder and in communication with said pressure source and the outer end of said larger cylinder and the atmosphere, said pilot valve being operable to connect the outer end of said larger cylinder to either said pressure source, whereby fluid under pressure is supplied to both sides of said larger piston and to the inner side of said smaller piston, or to the atmosphere whereby fluid under pressure is applied to the inner sides of both pistons and the outer ends of btoh cylinders are vented to the atmosphere, and means to actuate said pilot valve to cause the shuttle to reciprocate in said chamber.

2. Apparatus as in claim 1 wherein the cylinders are substantially axially aligned.

3. Apparatus as in claim 1 wherein the pilot valve is a three-way solenoid valve.

4. The combination with a sliding block valve for being connected to a source of fluid under pressure and having a body portion with a centrally positioned elongated enclosed chamber therein, said body having a passageway for supplying fluid under pressure from said source to a port in one side of said chamber and a plurality of conduits for connection to another instrument leading from the opposite side of said chamber, and a shuttle having a large central cavity in continuous communication with said port and being of less length but substantially the same height and width as said chamber positioned in said chamber for reciprocal movement lengthwise therein, said shuttle having an opening extending from said cavity to the opposite side for alternately registering with said conduits whereby to control the supply of fluid under pressure to said other instrument and the exhaust of fluid therefrom; of actuating mechanism for reciprocating said shuttle in said chamber comprising a pair of axially aligned oppositely disposed cylinders of unequal cross-sectional area removably secured to opposite sides of said body outwardly of the ends of said chamber, the inner ends of said cylinders being in communication with said chamber, said shuttle having openings extending from said cavity through the opposite ends of the shuttle to maintain equalized pressure at opposite ends of said chamber, a piston mounted in each of said cylinders for reciprocation therein, a piston rod having a substantially smaller cross-section area than that of said smaller piston connecting said pistons and extending longitudinally through said shuttle and the central cavity therein, means operatively connecting the piston rod and shuttle, the outer end of said smaller cylinder being continuously vented to the atmosphere whereby the pressure in said chamber continuously urges said smaller piston outwardly, and a pilot valve adjacent the outer end of said larger cylinder and in communication with said pressure source and the outer end of said larger cylinder and the atmosphere, said pilot valve being operable to connect the outer end of said larger cylinder to either said pressure source, whereby fluid under pressure is supplied to both sides of said larger piston and to the inner side of said smaller piston, or to the atmosphere, whereby fluid under pressure is applied to the inner sides of both pistons and the outer ends of both cylinders are vented to the atmosphere, and means to actuate said pilot valve to cause the shuttle to reciprocate in said chamber.

5. Apparatus as in claim 4 wherein there is a lost motion connection between the piston rod and shuttle permitting some movement of the piston rod in each direction before it effects movement of the shuttle.

6. Apparatus as in claim 4 wherein said piston rod passes through substantially the cross-sectional center of said shuttle.

7. Apparatus as in claim 4 wherein the piston rod is freely movable with respect to said shuttle, washers are positioned on said piston rod adjacent the shuttle ends, and spacers are loosely mounted on said piston rod between said pistons and said washers, said spacers being of a length to provide a small accumulative clearance from piston to piston.

8. Apparatus as in claim 4 wherein the pilot valve is a three-way solenoid valve.

References Cited

UNITED STATES PATENTS

| | | | |
|---|---|---|---|
| 149,019 | 3/1874 | Witty | 137—625.68 |
| 649,475 | 5/1900 | Paulsen | 251—77 |
| 2,460,908 | 2/1949 | Scott | 137—625.64 |
| 2,542,082 | 2/1951 | Hodgson | 137—625.68 |
| 3,020,927 | 2/1962 | McLaughlin | 137—625.68 |
| 3,103,339 | 9/1963 | Wulf | 137—625.25 |
| 3,171,439 | 3/1965 | Lansky et al. | 137—625.66 XR |
| 3,211,183 | 10/1965 | Eickmann | 137—625.68 |

HENRY T. KLINKSIEK, Primary Examiner

U.S. Cl. X.R.

251—77

PO-1050
(5/69)

UNITED STATES PATENT OFFICE
CERTIFICATE OF CORRECTION

Patent No. 3,478,781      Dated November 18, 1969

Inventor(s) William I. McLaughlin

It is certified that error appears in the above-identified patent and that said Letters Patent are hereby corrected as shown below:

Column 1, line 67, "all" should read -- an --. Column 3, line 16, "slidably" should read -- slidable --. Column 7, line 10, "cross-section" should read -- cross-sectional --. Column 8, under "References Cited", "3,103,339" should read -- 3,103,233 --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents